(12) United States Patent
Nieto

(10) Patent No.: US 7,580,878 B1
(45) Date of Patent: Aug. 25, 2009

(54) DATA FUSION FOR AUTOMATED BUSINESS DECISIONS

(75) Inventor: Raymond A. Nieto, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 1353 days.

(21) Appl. No.: 10/313,557

(22) Filed: Dec. 6, 2002

(51) Int. Cl.
*G06Q 40/00* (2006.01)
(52) U.S. Cl. .......................... 705/36; 705/37
(58) Field of Classification Search ............ 705/36–37
See application file for complete search history.

(56) References Cited

U.S. PATENT DOCUMENTS

| | | | |
|---|---|---|---|
| 4,829,426 A | 5/1989 | Burt | |
| 5,732,397 A * | 3/1998 | DeTore et al. | 705/1 |
| 5,918,211 A | 6/1999 | Sloane | |
| 5,983,220 A | 11/1999 | Schmitt | |
| 6,182,060 B1 | 1/2001 | Hedgcock et al. | |
| 6,463,431 B1 * | 10/2002 | Schmitt | 707/5 |

* cited by examiner

*Primary Examiner*—Thu Thao Havan
(74) *Attorney, Agent, or Firm*—Schwegman, Lundberg & Woessner

(57) ABSTRACT

Methods and systems for business decision-making are provided. Business data elements are fused together to form fused data sets. The fused data sets are analyzed as sets and business rules are applied to the sets. Based on the analysis and the applied business rules an automated business decision is selected and made.

19 Claims, 4 Drawing Sheets

DATA FUSION FOR AUTOMATED BUSINESS DECISIONS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright©2002, NCR Corp. All Rights Reserved.

FIELD OF THE INVENTION

The present invention relates to data fusion, and in particular to methods and systems that automate the business decision-making process.

BACKGROUND OF THE INVENTION

Business decisions made from a cohesive view of a business enterprise are critically important to ensure the enterprise is operating at its most efficient levels. Just as human body systems take input from their senses in order to automatically regulate heart rate, oxygen level, and blood flow to fit an appropriate need without requiring conscience decisions, automated business decision-making should occur when data is "fused" together. The fused data should form a view of a business situation and should be used to apply knowledge with respect to appropriate actions that are necessary for a given business system/environment.

A "data fusion" approach differs from conventional "automation" approaches to decision making in that there is not a clear relationship between the data elements and any specific business rules (e.g., one can't simply take a data element and compare it to established thresholds to accurately determine the applicability of a business rule). With data fusion multiple data elements are collectively analyzed, before a decision is made. The individual data elements themselves may not have significant meaning alone and, in fact, may appear unrelated; however, when joined together with other data elements and/or through applied analytics, the data elements can create a context of what is actually happening and thus provide a more accurate view of a given business situation that needs to be addressed. Yet, existing business decision-making techniques do not use data fusion.

With existing techniques, data elements are used to directly trigger business rules. These approaches are linear, rigid, and often hard coded into business systems for the enterprise. As a result, new business situations are often not detected with present techniques, since any new situation must be hard coded or otherwise accounted for within the business systems before it can be detected.

Moreover, if data elements appear to be related, then conventional approaches will often empirically adjust the business rules within the systems to account for these relationships. One of ordinary skill in the art readily appreciates, that hard coded adjustments to the business systems is not a preferred choice of the enterprise, since often business conditions are dynamically and rapidly changing, and there is a delay before these changed circumstances can be adequately represented in the business systems. During this delay, new situations can also occur that further complicate and delay an enterprise's attempt to provide a robust, timely, and efficient business decision-making system.

Therefore, there exist needs for providing techniques, methods, and systems that use data fusion techniques to automate business decision-making. With such techniques, methods, and systems, enterprises can more timely and efficiently react and adjust to their environment and market.

SUMMARY OF THE INVENTION

In various embodiments of the present invention methods and systems are described to select and make business decisions. More specifically, and in one embodiment, a method to select a business decision is presented. A plurality of business data elements are assembled into fused data sets. A change is detected when at least one of the business data elements is altered. Next, the fused data sets are updated to reflect the detected change. Moreover, the fused data sets are analyzed and one or more business rules are applied to the analyzed fused data sets. Finally, a business decision is selected based on application of the one or more business rules.

In still another embodiment of the present invention, another method to select a business decision is described. An event indicating that one or more fused data sets have been altered is received. The event is propagated to an analytic application that automatically evaluates the one or more fused data sets and produces results data. Furthermore, one or more business rules are automatically applied to the one or more fused data sets using the results data. Next, a business decision is automatically selected based on the application of the one or more business rules.

In yet another embodiment of the present invention, a business decision-making system is provided. The business decision-making system includes a data store, an analytic engine, a business rules engine, and a decision engine. The decision engine automatically makes business decisions based on fused data sets associated with data elements included within the data store that are associated with one another. Moreover, the decision engine makes the business decision based on processing results of the analytic engine that performs calculations on the fused data sets and based on the processing of the business rules engine, which applies business rules against the fused data sets.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
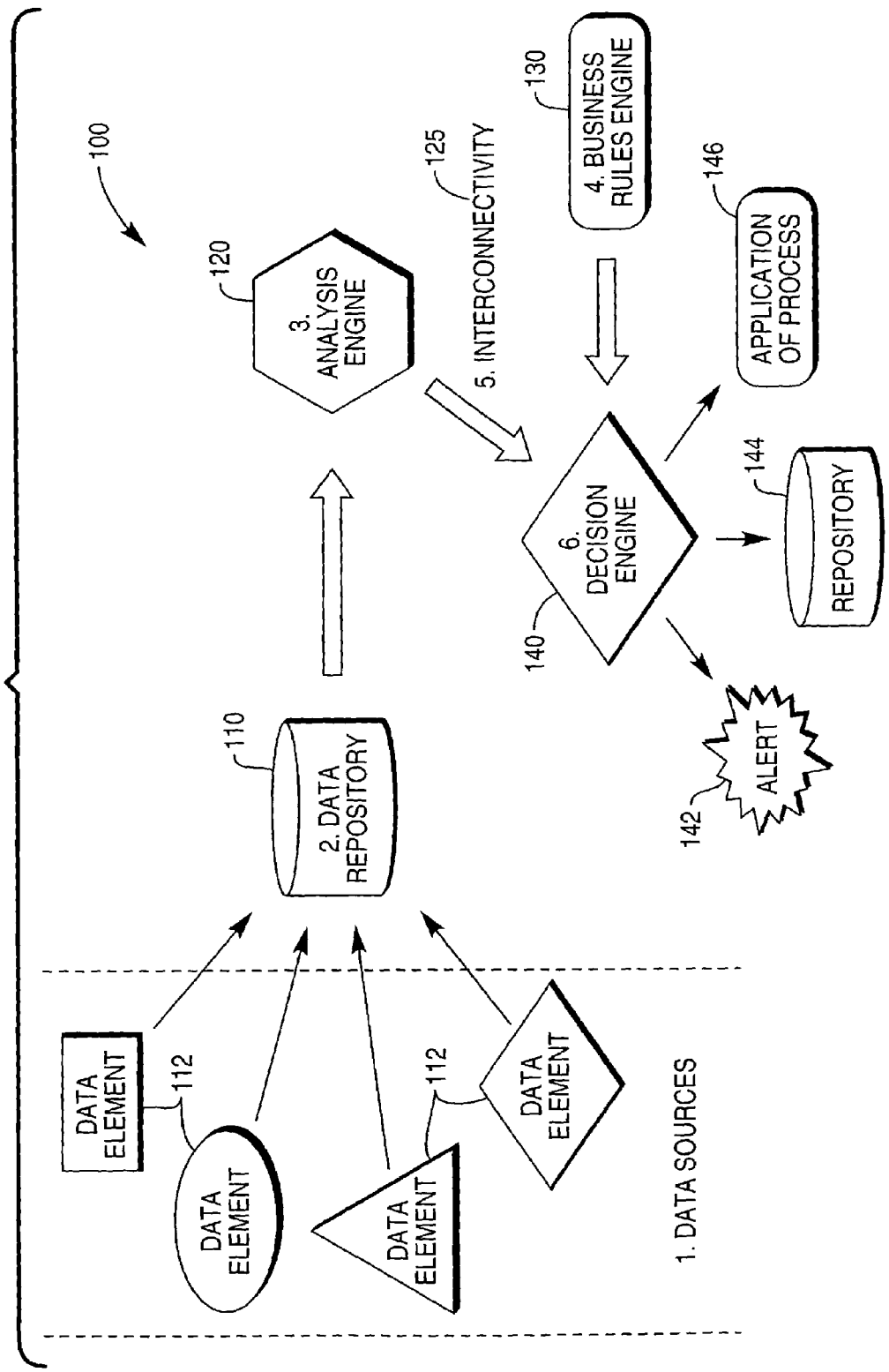
FIG. 1 is a diagram of a decision-making system, according to the teachings of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, data elements related to business data are housed in a data store. In one embodiment, the data store is a data warehouse, such as the Teradata warehouse, distributed by NCR Corporation of Dayton, Ohio. Various data store applications interface to the data store for acquiring and modifying the product data. Of course as one of ordinary skill in the art readily appreciates, any data store and data store applications can be used with the teachings of the present disclosure. Thus, all such data store types and applications fall within the scope of the present invention.

Various embodiment of the present invention use data fusion with the data elements associated with a business data collected by an enterprise. In data fusion, different combinations of the data elements and their values can create different views of a business situation. Analytics can be applied to help create a cohesive view of the fused data elements, and in fact, multiple analytical approaches may be applied in succession in order to reach a desired state from which to make a decision. The data elements themselves can be from a variety of sources and can be of differing types (e.g. transaction history, voice analysis, market dynamics, geospatial data, behavioral profiling, weather patterns, and others) when analyzed and combined. This may make for more complex analysis and decision-making, but results in a clearer, higher-level view of the business situation to be addressed.

The types of business decisions to be made can include something as simple as adding a customer to a marketing campaign and initiation its deployment, or automatically starting up new application instances to handle increasing workloads in a computer system while taking into account resource sharing constraints for other application workloads on the same system. Other applications of "data fusion" can enable more complex decisions such as updating the data on a call center representative's screen while interacting with a customer in real-time, based on a voice analysis of the customer combined with customer interaction history gathered from multiple divisions of the business, an analysis of the customer's analyzed behavior characteristics, propensity of the customer's profile group to react to a situation in a particular manner, and current operational metrics to support the service being presented to the customer. Another example is a personalized offering being created for a potential buyer and sent to their portable communication device for instant redemption based on current geospatial data relating the proximity to a particular service provider location, recent online shopping patterns, customer interaction history, customer behavioral profiling trends, credit history, and an analysis of "potential to buy".

Also, as a result of data fusion business systems can raise alerts to human operators when the analysis shows that a current customer has a "greater than expected" propensity to switch service providers based on a variety of data—not including specifically canceling service—including analysis of their call data records, application services usage, reported problem history, payment history, online shopping patterns, current resource availability, and an analysis of the customer's correlation toward customer category behavioral trends. Data fusion can also enable automatically changing the price of an item based on cost history, current vendor incentives, updated store sales targets, customer buying patterns, inventory levels, product gross margin contribution levels, time of day, weather patterns, a customer's propensity to purchase other items in the same "market basket", and recent competitive price changes. As one of ordinary skill in the art readily appreciates there are many other business circumstances in which to apply Data Fusion for business decision-making. All such circumstances are intended to fall within the broad scope of the present disclosure.

FIG. 1 illustrates a diagram of one decision-making system 100, according to the teachings of the present invention. The decision-making system 100 includes a data repository/store 110, an analysis engine 120, a business rules engine 130, and a decision engine 140. The decision-making system is implemented within a computing environment. The computing environment includes a plurality of computing devices, storage devices, and application software. The various components of the computing environment are networked together within the computing environment. The network configuration can be a Local Area Network (LAN) and/or a Wide Area Network (WAN (e.g., Internet, and others)). In fact, any configuration of a computing environment and network designed to achieve the tenets of the present disclosure are intended to fall within the broad scope of the present invention.

The data repository 110 can be a single data warehouse housing business data of an enterprise that is assembled from a plurality of different data storage devices. Alternatively, in some embodiments, the data repository 110 is a single data store (e.g., relational database, object oriented database, electronic data files, and others). The data repository 110 includes a plurality of data elements 112 associated with an enterprise. For example, account numbers, customer names, customer orders, customer age, customer gender, customer demographics, customer contact data, customer payment data, and other data elements 112 recorded by the enterprise.

Data elements 112 can be collected and housed in the data repository 110 using a variety of manual techniques, automated techniques, and input devices. For example, manually collected data elements 112 can be inputted into the data repository 110 by a data entry person using input interfaces associated with the data repository 110. Moreover, data elements 112 can be automatically inputted into the data repository 110 through Application Programming Interfaces (APIs) and devices networked together. For example, a cash register scanner or credit card scanner can automatically supply customer transaction data elements 112 to the data repository 110. Thus, as is readily apparent to one of ordinary skill in the art, a plurality of techniques and/or combination of techniques can be used to input the data elements 112 to the data repository 110. All such techniques and input devices are intended to fall within the broad scope of the present disclosure.

The data repository 110 is logically organized according to a schema. The schema is designed to include relationships known to the enterprise between different data elements. For example, an enterprise may known through empirical analysis that a customer's marital status, gender, and age will impact whether a customer would be interested in a particular product or server of the enterprise. These relationships can be embodied within the data repository 110 as links, fields, or through any other electronic association. These relationships permit the data elements 112 that are related to one another to be extracted as fused data sets.

These fused data sets are then provided as sets to an analysis engine 120. The analysis engine 120 can be any existing analysis engine 120 or custom developed analysis engine 120 designed to achieve the tenets of the present disclosure. The analysis engine 120 can include simple calculations or a plurality of complex statistical calculations. The analysis engine 120 takes the values associated with data elements 112 for a fused data set and performs analysis to produce results data. The results data can include listings of customers that satisfy certain requirements embedded within the analysis engine along with a probability factors associated with each customer that the customer may make a purchase from the enterprise. Of course as one of ordinary skill in the art readily appreciates, a variety of results can be produced from an analysis engine 120 to further the needs of an enterprise. All such results that utilize fused data sets from a plurality of associated data elements 112 are intended to fall within the broad scope of the present invention.

Once the analysis engine 120 has evaluated the values of the data elements 112 included within the fused data, the results and fused data are provided to a business rules engine 130. The business rules engine 130 is additional application logic that can inspect the results and/or values for each individual data element within the fused data to take some further automated action. For example, a business rules engine 130 can automatically generate a call record to a telemarketer based on certain criteria within the results data, such as all customers with a probability of purchase that exceeds 75%. Those of ordinary skill in the art are familiar with business rules engines 130, and all such business rules engines 130 that use the fused data sets of the present invention are intended to fall within the broad scope of the present invention.

Once the business rules engine 130 has evaluated the results of the analysis engine 120 and/or a value of the fused data, a business decision engine 140 is processed. The business decision engine 140 is used to dynamically evaluate business rules that are processed in order to make intelligent and automated business decisions for the enterprise. For example, if a large customer contact or call list is automatically produced from the business rules engine 130, the enterprise may desire for some of the work to be outsourced or may desire for additional telemarketers to be hired within the enterprise. Moreover, the decision engine 140 can be used to make decisions about purchasing, planning, and/or inventory for the enterprise.

In some instances, the business decision engine 140 can be authorized or configured to make certain types of decisions automatically without any intervention on the part of an analyst or administrator. For example, the decision engine can be configured to automatically order office supplies, such as paper, envelopes, and the like. In other instances, the business engine 140 can be configured to receive authorization before making a decision, such as when large purchases of raw materials are needed or when authorizations to managers within the enterprise is given to make large purchases or to hire additional staff. When the business decision engine 140 is configured to acquire external authorization before making a decision, the business decision engine 140 can issue alerts 142. The alerts can be sent to appropriate and configured personnel identifications that are permitted to make the decision or otherwise authorize the business decision engine 140 to make the decision.

Decisions made can also be more complex and require the decision engine 140 to perform a variety of computations. For example, the decision engine 140 can use Boolean logic, neural networks, weighted decision trees, fuzzy logic, or artificial intelligence applications to assist in arriving at selecting an appropriate business decision. The decision engine 140 can record the decision made given a particular set of circumstances (e.g., a particular set of applied business rules, and values for a fused data set), so that complex calculations can be limited when a recurring state is detected by the decision engine 140. Thus, in some embodiments, the states and selected decisions can be housed in an enterprise's knowledge repository/store 144. The decision engine 140 can also execute a number of business applications or processes 146 when selecting a business decision and/or making a business decision.

The business decision engine 140 can also make new decisions that had never before occurred for a given set of circumstances. For example, the business decision engine 140 can give a set of circumstances a score and the score can be used to select a business decision that is associated with a similar score. In this way, the particular set of circumstances can be new and never before encountered, but the decision engine 140 can still make and/or select a business decision for the enterprise.

In some embodiments, the components of the decision-making system 100 can be interfaced together using Interconnectivity 125 applications. For example, the various components can exist in different computing environments and operate on different internal networks. Interconnectivity 125 applications can be used to communicate between the disparate environments and networks so that the entire decision-making system 100 operates as one integrated system. This can be achieved with a number of techniques, such as converting messages between disparate network formats and the like. The messages can be viewed as events that cause components to take automated action.

One of ordinary skill in the art now understands, how business decisions can be automatically selected and made with various embodiments of the presented business decision-making system 100. The decision-making system 100 provides automated and non-linear approaches to selecting and making business decisions by analyzing and processing related data elements 112 as fused data sets.

Figure 2:
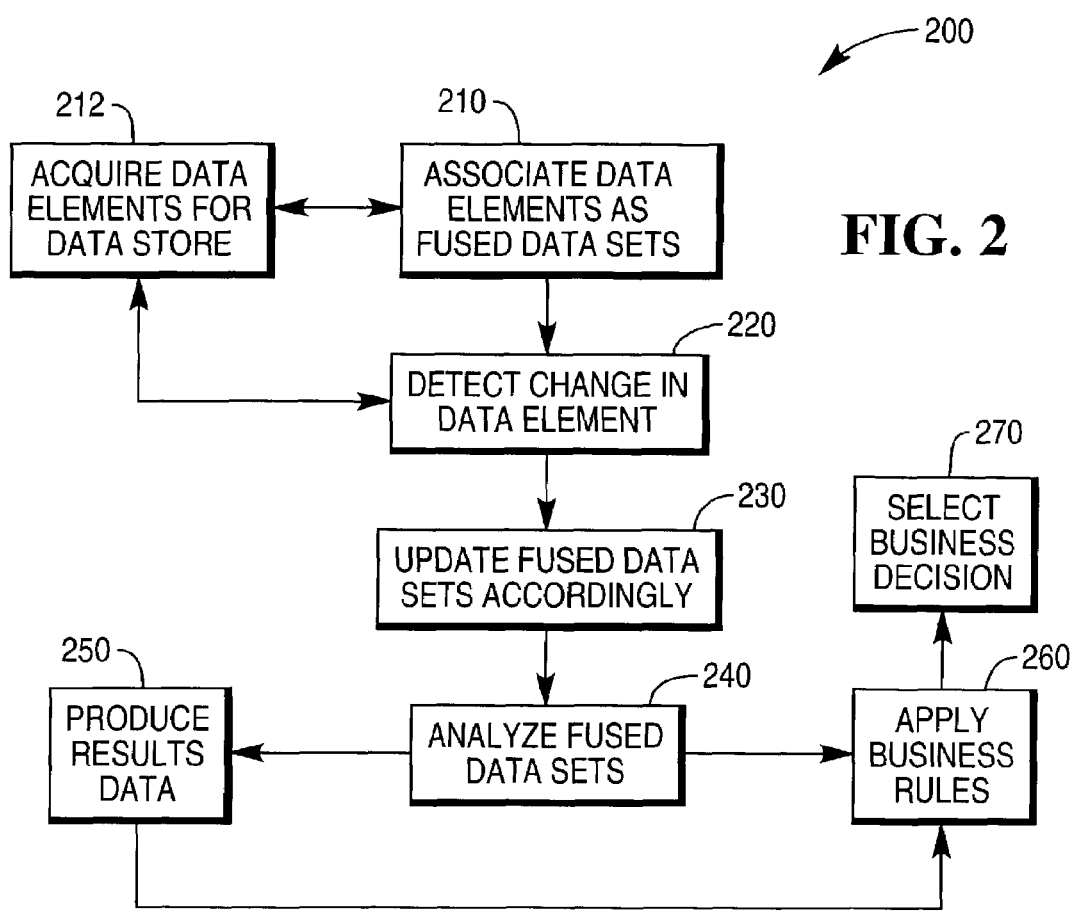
FIG. 2 is a flow diagram representing a method for selecting a business decision, according to the teachings of the present invention.

FIG. 2 illustrates a flow diagram representing one method 200 for selecting a business decision, according to the teachings of the present invention. The method 200 is implemented as a plurality of software applications that communicate with one another in order to achieve the tenets of the present disclosure. The software applications need not reside on a single computing device and can be dispersed across a network.

Initially, at 210, a plurality of business data elements associated with business data being tracked by an enterprise is associated with one another to form fused data sets. Each fused data set is formed by identified relationships included within or discernable from the data elements. In one embodiment, these relationships are identified in a schema of a data store that houses the data elements. Thus, at 212, and in some embodiments, the fused data sets are acquired form or derived from data elements acquired from a data store. In some embodiments, the data store is a data warehouse that includes a plurality of data sources and/or databases. In other embodiments, the data store is an electronic file or a single database.

As some point in time after the fused data sets are assembled or known, changes may occur with one or more of the data elements associated with a number of the fused data sets. Changes can occur when values associated with a particular data element is altered, when a new data element is added to a fused data set relationship, and/or when a particular data element is removed from a fused data set relationship. Accordingly, at 220, any change in a data element that affects a fused data set is detected.

Changes to data elements that affect a fused data set can be detected in with a variety of techniques. For example, data store triggers or events can send messages or execute applications automatically when a change occurs. In still other embodiments, applications can run on a continuous and/or periodic basis to examine data elements within the data store and report any changes detected. Of course as one of ordinary skill in the art appreciates, a variety of other techniques can be used to automatically detect changes with data elements associated with fused data sets. All such techniques are intended to fall within the broad scope of the present disclosure.

Once changes are detected in one or more of the data elements, the corresponding affected fused data set is updated at 230. Next, the updated fused data sets are analyzed by one or more analytical applications at 240. The analytical applications are readily available and known to those of ordinary skill in the art. These applications receive the values associated with the data elements of the fused data sets and produce results data, such as, and by way of example only, probabilities and/or selection of customers where action may be desired based on the changes detected. Thus, at 250, results data is produced after the fused data sets have been analyzed by one or more analytical applications.

The results data and the fused data sets are then passed to one or more business rules applications, where at 260 business rules are applied. The business rules applications take the results data and the fused data sets and take some action. For example, if the results data includes probabilities associated with customers that may purchase a product, then the business rules application can assemble a customer call list based on selecting only those customers from the results data that exceed some predefined threshold value (e.g., probability greater than 75%).

Once the business rules applications have applied their rules, a business decision is selected at 270 by one or more business decision applications. The business decision applications take as input the fused data sets, the results data, and a record of the business rules applied by the business rules applications. This information can then be analyzed by the business decision applications to produce a state for the enterprise. In some cases, the state may already exist within an enterprise's knowledge store and may have a desired decision that is to be selected. In other instances, the state may be new but closely resemble other previously known states that exist in the enterprise's knowledge store, such that the business decision-making applications can automatically select similar decisions made with the similar and previously known states. Thus, the business decision-making applications can learn new states and take action on their own without manual intervention.

Business decision-making applications can be configured to take action on their own, or can be configured to send alerts or messages to an analyst or decision maker before taking any automated action. Thus, the enterprise can permit the business decision-making applications to select and make decisions when the determined state representing the business environment is considered loss risk and the decision made is low risk. In a similar manner, if the state represents a significant change or business decision (e.g., large outlays of capital, and the like), then the business decision-making applications can suggest a decision, but wait for authorization before making the decision.

Various embodiments of method 200 permit an enterprise to dynamically monitor, analyze, and evaluate changing business environments. This is achieved by using fused data sets that represents related data elements and propagating changes detected in data elements to various other applications that analyze the effect of the changes. Moreover, business rules can be applied and an entire enterprise state determined. The state can then be used to select and/or make an automated business decision.

Figure 3:
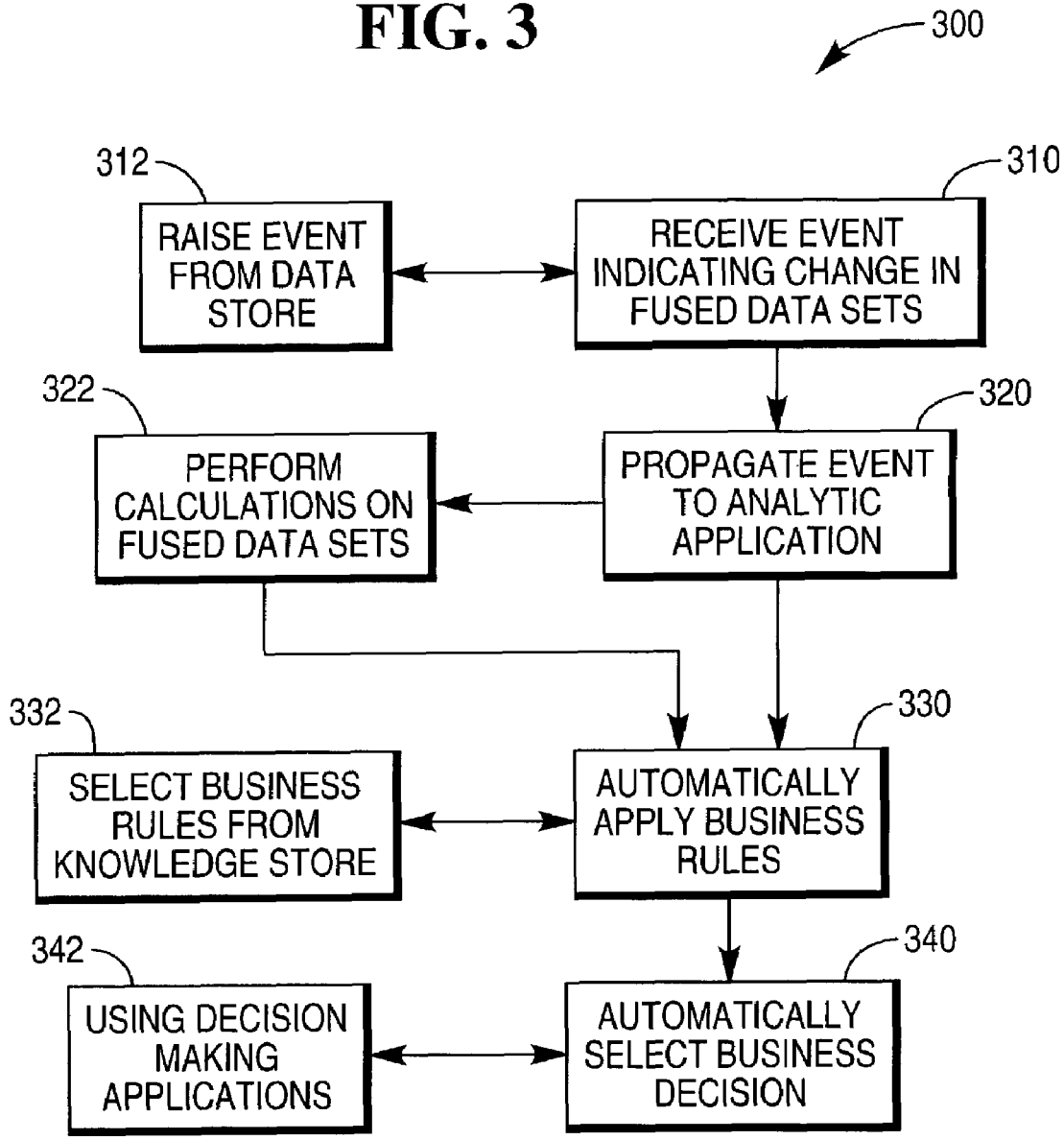
FIG. 3 is a flow diagram representing another method for selecting a business decision, according to the teachings of the present invention.

FIG. 3 illustrates a flow diagram representing another method 300 for selecting a business decision, according tb the teachings of the present invention. The method 300 is implemented in a computing environment and processed as a number of software applications. The computing environment can be configured on one or more networks.

At 310, an event is received indicating that a data element has been changed, added, or removed from a data store. Within the data store, data elements are logically associated into fused data set, which provides logical relationships between different data elements housed in the data store. The relationships can exist within the data store's schema or can be hard coded as a unique link with each of the data elements. The relationships are assembled to create the fused data sets. In one embodiment, the data store is a data warehouse, such as the Teradata warehouse distributed by NCR Inc., of Dayton Ohio. In other embodiments, the data store is one or more electronic files or a single database. The event can be automatically raised within the data store when a data element is added, removed, and/or modified, as depicted at 312. Alternatively, a separate application can raise the event upon periodic inspection of the data elements within the data store.

At 320, the raised event is propagated to an analytic application. The analytic application acquires the effected fused data set and the values of the data elements associated with the effected fused data set in order to analyze the effect of the change. Accordingly, in performing the analysis, at 322, a number of calculations against the fused data sets are processed. Upon conclusion of the analytic processing results data is produced.

At 330, a number of business rules applications are processed against the fused data sets and the results data produced by the analytic applications. The rules applied against the fused data sets can be selected, in some embodiments, from an enterprise's knowledge store as depicted at 332. The business rules applications take action based on the fused data sets and the results data.

Accordingly, at 340, a business decision application is processed in order to automatically select an appropriate business decision. The business decision application can execute a number of business applications in arriving at the selection of a particular business decision as depicted at 342. The business decision application analyzes the fused data sets, the results data, and/or the rules applied by the business rules applications. This analysis can use Boolean logic applications, neural network applications, weighted decision tree applications, fuzzy logic applications, and/or AI applications in order to create a state of the current business environment. This state can be compared against previous states to select an appropriate business decision. In some cases, the decision can also be automatically made by the business decision application. In other cases, the business decision application alerts an analysis or decision maker as to the current state of the business environment and a selected decision in order to receive authorization to proceed with processing the selected decision. Moreover, in some embodiments, the business decision application makes a decision that has never been made before by analogizing a previous recorded state to the current state and using the decision made with the previous recorded state for the current state.

One of ordinary skill in the art now appreciates how seemingly unimportant changes in a few data elements can generate a significant business decision when the data elements are fused together to form fused data sets that are processed as a unit. The fused data sets are then analyzed, have rules applied, and a have a current business state created. The current business state allows an automated business decision to be selected and made. In this way, an enterprise can significantly automate its business systems and integrate them together to provide dynamic and real time decisions to the enterprise.

Figure 4:
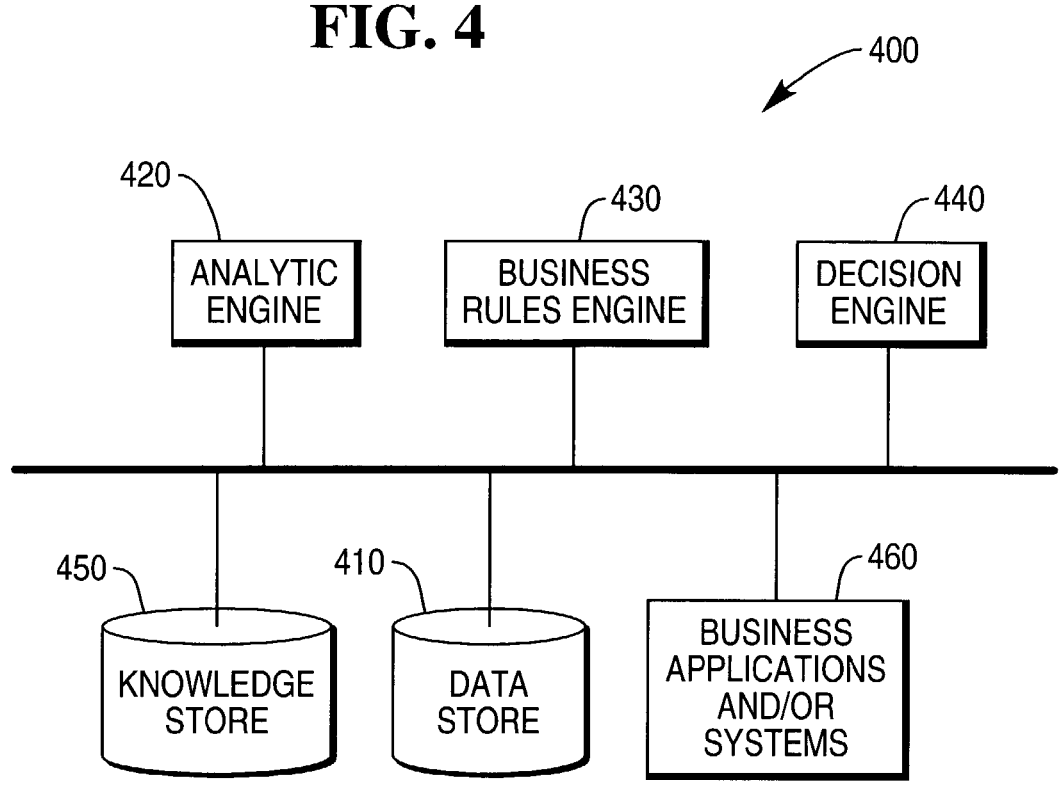
FIG. 4 is another diagram of a decision-making system, according to the teachings of the present invention.

FIG. 4 illustrates another diagram of a decision-making system 400, according to the teachings of the present invention. The decision-making system 400 includes a data store 410, an analytic engine 420, a business rules engine 430, and a decision engine 440. In some embodiments, the decision-making system 400 also optionally includes a knowledge store 450 for housing business rules and decisions of an enterprise, and one or more other business applications and/or systems 460 for processing business decisions and/or business reports. The decision-making system 400 is implemented in a computing environment and the components are interfaced together through one or more computer networks.

The data store 410 includes one or more storage devices and applications that permit access to the data store 410. The data store 410 can be a single data warehouse that integrates a plurality of databases, or the data store 410 can be one or more databases or electronic data files. The data store 410 is used to house business data collected by an enterprise. The business data is referred to as data elements. The data elements can be automatically captured and stored in the data store 410 or manually captured and stored in the data store 410. In addition, the data elements have one or more logical identifiers that related the data elements in the data store 410 as fused data sets or collections of related data elements. The fused data sets can be defined within a schema for the data store 410 or can be physically linked within the data elements via pointers or links.

The decision engine 440 automatically makes business decisions based on the values associated with the fused data sets, processing results associated with the analytic engine 420, and applied rules made by the business rules engine 430. A business decision can be to send an alert or message to an analysis or to a decision maker within the enterprise. Moreover, the business decision can result in one or more business applications and/or systems 460 being processed by the decision engine 440.

In various embodiments of the decision-making system 400, events are raised from the data store 410 when data elements are added, deleted, or modified. These events are propagated to the analytic engine 420 where results data is produced. Next, the business rules engine uses the updated fused data sets and the results data to apply one or more business rules resulting in some automated action taking place within the enterprise. Finally, the decision engine 440 uses the rules applied by the business engine 430, the results data produced by the analytic engine 420, and the values of the fused data sets included within the associated data elements of the data store 410 in order to select and make a business decision. In some embodiments, the business rules and decisions are stored in an enterprise's knowledge store 450 for ease of reference and for recording events within the enterprise.

Further, in some embodiments, the decision engine 440 uses a plurality of inputs such as the values of the fused data sets, the business rules applied, and the results data produced in order to create a current context or state from which a business decision is selected and/or made. In creating the business state or context, the decision engine 440 can use Boolean logic applications, neural network applications, weighted decision tree applications, fuzzy logic applications, and/or AI applications. Moreover, when a decision is made or a desired business decision is selected, the decision engine 440 can process a number of business applications and/or business systems (e.g., reports, purchasing orders, and the like) 460.

One of ordinary skill in the art now understands upon reading and comprehending the present disclosure, how fused data sets can be used to create a more realistic and dynamic view of the enterprise. This is achieved by integrating various components of a business enterprise and automatically propagating changes to data elements that are associated with fused data sets in order to automatically process the various components. Thus, an enterprise is now better equipped to deal with real time and dynamic changing circumstances in an automated manner.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives; modifications, equivalents, and variations that fall within the spirit and broad scope of the attached claims.

What is claimed is:

1. A computer-implemented method to select a business decision and executed by a computing device, comprising:
    associating, by the computing device, a plurality of business data elements into fused data sets, wherein each fused data sets include different types of the business data elements acquired from different data sources and the data types include transaction history, voice analysis, market dynamics, geospatial data, behavioral profiling, and weather patterns;
    detecting, by the computing device, a change in at least one of the business data elements;
    updating, by the computing device, the fused data sets;
    analyzing the fused data sets by processing one or more analytical applications to produce results data as probabilities and selection of customers for which actions are needed;
    applying, by the computing device, one or more business rules having the actions to the analyzed fused data sets; and
    selecting, by the computing device, a business decision based on application of the one or more business rules, wherein the updated fused data sets, the analyzed fused data sets, and the applied one or more business rules are used to produce a state of an enterprise associated with the one or more business rules and a knowledge store having previously known states and existing business decisions associated with those previously known states is accessed to select the business decision.

2. The method of claim 1 further comprising housing the data elements and the fused data sets in a data store.

3. The method of claim 1 wherein in detecting the change, the change is detected when a trigger or an alert is issued from the data store indicating that the at least one data element has been changed.

4. The method of claim 1 wherein in updating the fused data sets, the fused data sets are updated in a data warehouse.

5. The method of claim 1 wherein in applying one or more of the business rules, the results data is used to select one or more of the business rules to apply against the analyzed fused data sets.

6. The method of claim 1 wherein in selecting the business decision, the selected business decision is made by evaluating the applied one or more business rules and the fused data sets.

7. A computer-implemented method to select a business decision and executed by a computing device, comprising:
 receiving, by the computing device, an event indicating that one or more fused data sets have been altered, and wherein data elements of the fused data sets include different data types selected from different data sources, and wherein that data types include transaction history, voice analysis, market dynamics, geospatial data, behavioral profiling, and weather patterns;
 propagating, by the computing device, the event to an analytic application that automatically evaluates the one or more fused data sets and produces results data, wherein the results data includes probabilities that the analytical application produces for values assigned to data elements in the more or more fused data sets, the probabilities associated with taking actions in response to the event, and wherein the results data includes selections of particular customers for taking the actions against;
 automatically applying, by the computing device, one or more business rules to the one or more fused data sets using the results data for purposes of taking a particular action by comparing the probabilities to a predefined threshold defined in the one or more business rules; and
 automatically selecting, by the computing device, a business decision based on the application of the one or more business rules, and wherein the business decision is produced by one or more business decision applications that take as input the one or more fused data sets, the results data, and a record of the one or more business rules applied and produces a state for an enterprise associated with the one or more business rules, and wherein the business decision is selected
 in response to an existing state recorded within a knowledge store of the enterprise, the existing state associated with a particular decision and the existing state is the state produced by the one or more business decisions, or wherein the business decision is selected in response to a particular state in the knowledge store that the state closely resembles, the particular state also exists in the knowledge store and the particular state having its own decision, which is used as the business decision.

8. The method of claim 7 wherein in receiving the event, the event is a data store event that is raised when a data element is altered or added to the data store, and the data element is associated with one or more of the fused data sets.

9. The method of claim 7 wherein in receiving the event, one or more of the fused data sets include data elements from a plurality of data stores.

10. The method of claim 7 wherein in receiving the event, the event is related to a data element that is added to or removed from one or more of the fused data sets.

11. The method of claim 7 wherein in propagating the event, the analytic application performs one or more calculations on data elements included within the one or more fused data sets.

12. The method of claim 7 wherein in automatically applying one or more business rules, the one or more business rules are selected from the knowledge store.

13. The method of claim 7 wherein in selecting the business decision, the business decision is a new decision that is generated based on the applying one or more of the business rules and the one or more fused data sets.

14. A business decision-making system, comprising:
 a data store;
 an analytic engine implemented in a computer environment and executed by a computing device;
 a business rules engine implemented in the computer environment and executed by the computing device; and
 a decision engine implemented in the computer environment and executed by the computing device and that automatically makes business decisions based on fused data sets associated with data elements included within the data store that are associated, and based on processing results of the analytic engine that performs calculations on the fused data sets and processing of the business rules engine, which applies business rules against the fused data sets, and wherein the results identify probabilities and selections of customers for which actions are to be performed and the actions identified in the business rules, and wherein the decision engine produces a state for a current business environment associated with the fused data sets, results for the calculations, and the processed business rules, and wherein the state is compared against previous states recoded in a knowledge store, each previous state having a previous decision, and selecting the business decisions in response to the comparing of the state to the previous states and their previous decisions, and wherein the data elements of the fused data sets include different data types selected from different data sources, and wherein that data types include transaction history, voice analysis, market dynamics, geospatial data, behavioral profiling, and weather patterns.

15. The business decision-making system of claim 14 wherein the data store is a plurality of databases.

16. The business decision-making system of claim 14 wherein the data store is a data warehouse.

17. The business decision-making system of claim 14 further comprising, one or more input recording devices for recording the data elements in the data store.

18. The business decision-making system of claim 14 wherein the decision engine executes one or more business applications in order to make the business decisions.

19. The business decision-making system of claim 14 wherein the decision engine uses at least one of a Boolean logic application, a neural network application, a weighted decision tree application, a fuzzy logic application, and an artificial intelligence application when making the business decision.

* * * * *